(12) United States Patent
Walz

(10) Patent No.: US 10,572,891 B2
(45) Date of Patent: Feb. 25, 2020

(54) PUNCHCARD CHECK-IN SYSTEM

(71) Applicant: Comenity LLC, Columbus, OH (US)

(72) Inventor: James Walz, Blacklick, OH (US)

(73) Assignee: Comenity LLC, Columbus, OH (US)

(*) Notice: Subject to any disclaimer, the term of this patent is extended or adjusted under 35 U.S.C. 154(b) by 1249 days.

(21) Appl. No.: 14/670,170

(22) Filed: Mar. 26, 2015

(65) Prior Publication Data

US 2016/0180258 A1 Jun. 23, 2016

Related U.S. Application Data

(63) Continuation-in-part of application No. 14/626,816, filed on Feb. 19, 2015, now Pat. No. 10,292,008.

(60) Provisional application No. 62/096,195, filed on Dec. 23, 2014.

(51) Int. Cl.
*G06Q 30/02* (2012.01)
*G06Q 10/02* (2012.01)
*H04W 4/021* (2018.01)

(52) U.S. Cl.
CPC ......... *G06Q 30/0231* (2013.01); *G06Q 10/02* (2013.01); *G06Q 30/0255* (2013.01); *H04W 4/021* (2013.01)

(58) Field of Classification Search
None
See application file for complete search history.

(56) References Cited

U.S. PATENT DOCUMENTS

| | | | |
|---|---|---|---|
| 2003/0182191 A1* | 9/2003 | Oliver | G06Q 30/02 705/14.27 |
| 2008/0119206 A1* | 5/2008 | Shalmon | G06Q 30/02 455/456.3 |
| 2010/0250351 A1* | 9/2010 | Gillenson | G06Q 30/02 705/14.13 |
| 2011/0276378 A1 | 11/2011 | Pointer et al. | |
| 2012/0101885 A1 | 4/2012 | Lee et al. | |
| 2012/0159310 A1 | 6/2012 | Chang et al. | |
| 2013/0217332 A1 | 8/2013 | Altman et al. | |
| 2014/0040120 A1 | 2/2014 | Cho et al. | |
| 2014/0074569 A1 | 3/2014 | Francis et al. | |
| 2014/0180826 A1 | 6/2014 | Boal | |
| 2015/0206128 A1 | 7/2015 | Torossian et al. | |
| 2016/0027292 A1* | 1/2016 | Kerning | H04W 4/90 455/404.2 |
| 2016/0183051 A1 | 6/2016 | Nack et al. | |

(Continued)

*Primary Examiner* — Jamie R Kucab

(57) ABSTRACT

A method for updating a virtual punchcard check-in system, including: accesses an input to a mobile device, wherein the input comprises a verification code that is displayed at a business establishment, wherein the verification code serves as a notification of an attempted check-in of a customer at the business establishment, wherein the customer is associated with the mobile device; based on comparing accessed mobile device identification information with a set of mobile device identification information, identifies the mobile device to achieve an identified mobile device; sends a request for a location check of the mobile device to a phone carrier; receives from the phone carrier a location identification of the location of the mobile device; and if the location identification matches a location of the business establishment, generates a message, wherein the message comprises a punchcard status for the business establishment as it relates to the customer.

14 Claims, 5 Drawing Sheets

(56) References Cited

U.S. PATENT DOCUMENTS

2016/0253651 A1    9/2016   Park et al.
2016/0253656 A1    9/2016   Dubuque et al.
2016/0321765 A1* 11/2016   Malone ................ G06Q 30/02
2017/0303082 A1   10/2017   Jones

* cited by examiner

PUNCHCARD CHECK-IN SYSTEM

REFERENCE TO RELATED APPLICATIONS

This application is a continuation-in-part application of and claims the benefit of co-pending U.S. patent application Ser. No. 14/626,816 filed on Feb. 19, 2015 entitled "GEOFENCING MESSAGING SYSTEM" by Walz et al., and assigned to the assignee of the present application, and is hereby incorporated by reference in its entirety herein.

U.S. patent application Ser. No. 14/626,816 claims the benefit of and claims priority to U.S. Provisional Patent Application No. 62/096,195 filed on Dec. 23, 2014 entitled "GEOFENCING MESSAGING SYSTEM" by James Walz.

BACKGROUND

Geofencing is a feature in a software program that uses the global positioning positioning system (GPS) or radio frequency identification (RFID) to define one or more geographic areas. Phone carriers that use geofencing technology "ping" mobile devices to determine the location of the mobile device. The geofencing software feature provides a service that sends messages, via a phone carrier, to the mobile devices of smartphone users who enter this defined geographic area(s). For example, some companies use phone carriers to send promotions to customers' smartphones when it is determined that the customer has entered a store, mall or neighborhood within the geofenced area. However, the "pinging" action performed by a phone carrier is provided at a cost, sometimes a cost per "ping". Thus, this method of geofencing may be exorbitantly expensive. Limitations exist with regard to current geofencing technology.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DESCRIPTION OF EMBODIMENTS

Figure 1:
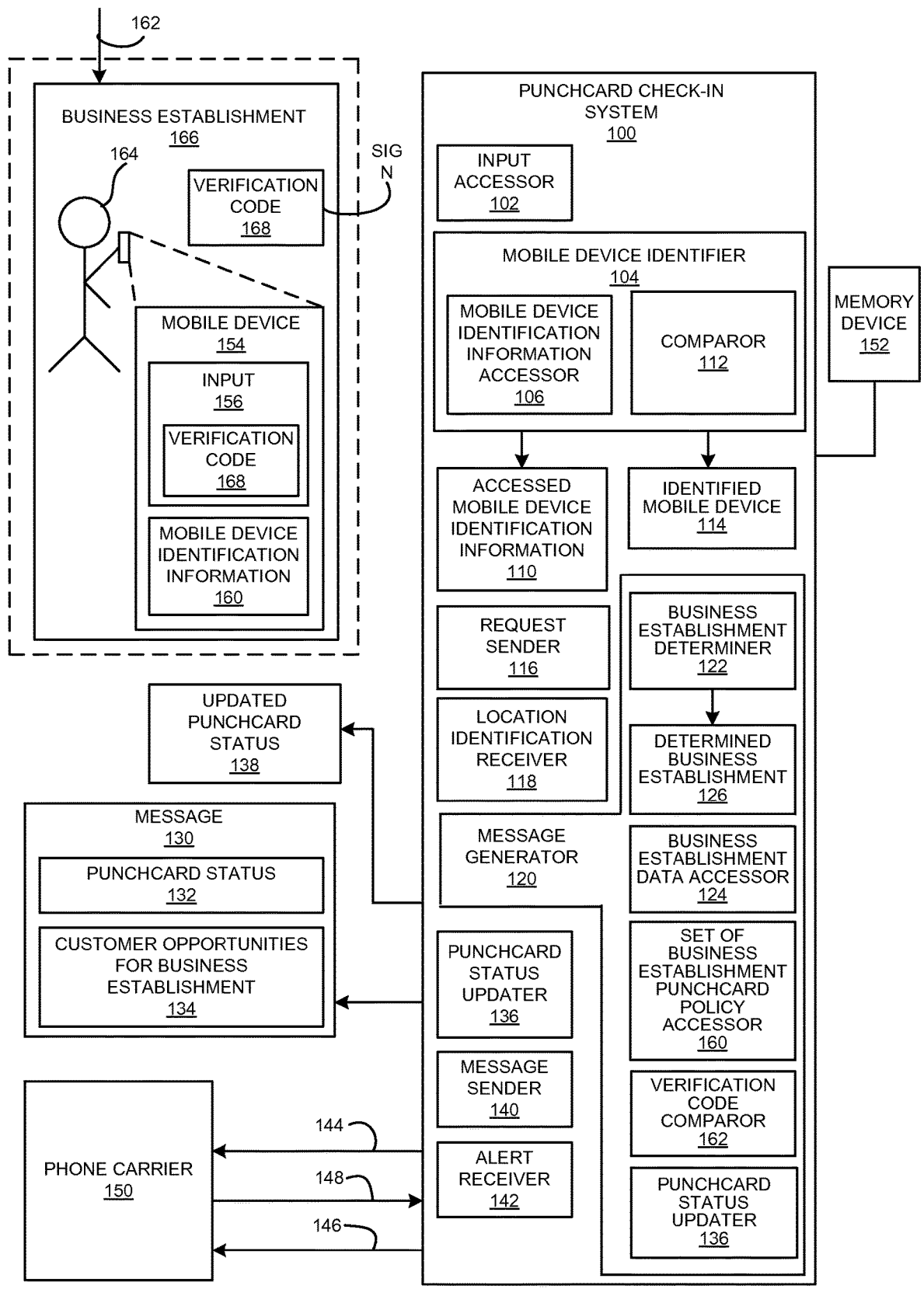
FIG. 1 is a block diagram that illustrates an embodiment of a punchcard check-in system, in accordance with an embodiment.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "accesses," "sends", "receives", "generates", "updates", "determines", "using", "compares", "transmits", or the like, often refer to the actions and processes of an electronic computing device (or portion thereof), module or system, such as, but not limited to, a punchcard check-in system (See FIGS. 1-3), unless noted otherwise. The electronic computing device/module/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Embodiments and Discussion

Many business establishments have a customer loyalty rewards program involving a punchcard, in which a customer's purchases are tallied. Upon reaching a purchasing total that is equivalent to a minimum dollar quantity, the punchcard is updated and the customer is then offered free and/or discounted goods and/or services. In general, embodiments of the present technology enable a virtual punchcard check-in system to be updated upon a customer's visit to a business establishment. Embodiments then transmit this updated punchcard status to the customer's mobile device. Thus, features of the present technology provide a punchcard check-in system and method for updating a virtual punchcard.

The following is a high-level non-limiting example of embodiments involving a punchcard check-in system and a method for updating a virtual punchcard. As will be explained, upon a successful check-in at a business establishment, the customer's virtual punchcard is updated. The now updated virtual punchcard triggers the presentation, to the customer via the mobile device, of discount offers for goods and/or services, etc. For example, when a customer visits a business establishment, the customer sees a display board that presents a "verification code". This verification code, upon entry into the mobile device and transmission to the phone carrier, serves as an attempted check-in of the customer at the business establishment. The customer enters this verification code into his mobile device (e.g., mobile phone). Once the verification code has been entered into the customer's mobile device, the mobile device sends a notification to the phone carrier that an attempted check-in at a particular business establishment is occurring. The phone carrier "pings" the mobile device to determine the mobile device's current location. If the mobile device is in a geofenced area, the phone carrier will be enabled to determine the mobile device's location. The phone carrier forwards the determined location of the mobile device to a service operating the punchcard check-in system.

The service that is operating the punchcard check-in system receives the location data for the mobile device. The punchcard check-in system compares the determined current location data for the mobile device with information stored at a memory device, such as, but not limited to, business establishment data that includes business locations, verification codes linked to the business establishment data, etc. If this comparison shows that the mobile device's current location is the same as the business establishment that is associated with the verification code that was entered into the mobile device, then the punchcard check-in system updates the punchcard associated with the business establishment and associated with the customer having the identified mobile phone. The updated punchcard status information is then sent to the mobile device for the customer's perusal. This punchcard status information includes, but is not limited to, discount offers on goods and/or services and immediate punchcard status information (e.g., how many more visits are needed to be recorded before the customer is eligible for more discount offers, etc.).

Significantly, embodiments do not require the phone carrier to continuously "ping" the customer's mobile device to determine whether or not the customer is at a particular business establishment. Instead, the phone carrier receives a notification to "ping" the mobile device. This notification is received from the entity operating the punchcard check-in system or portions thereof. Additionally, embodiments of the present technology do not require that the customer to be using a "smartphone". Embodiments may function with any type of mobile device, including any type of mobile phone.

Figure 2:
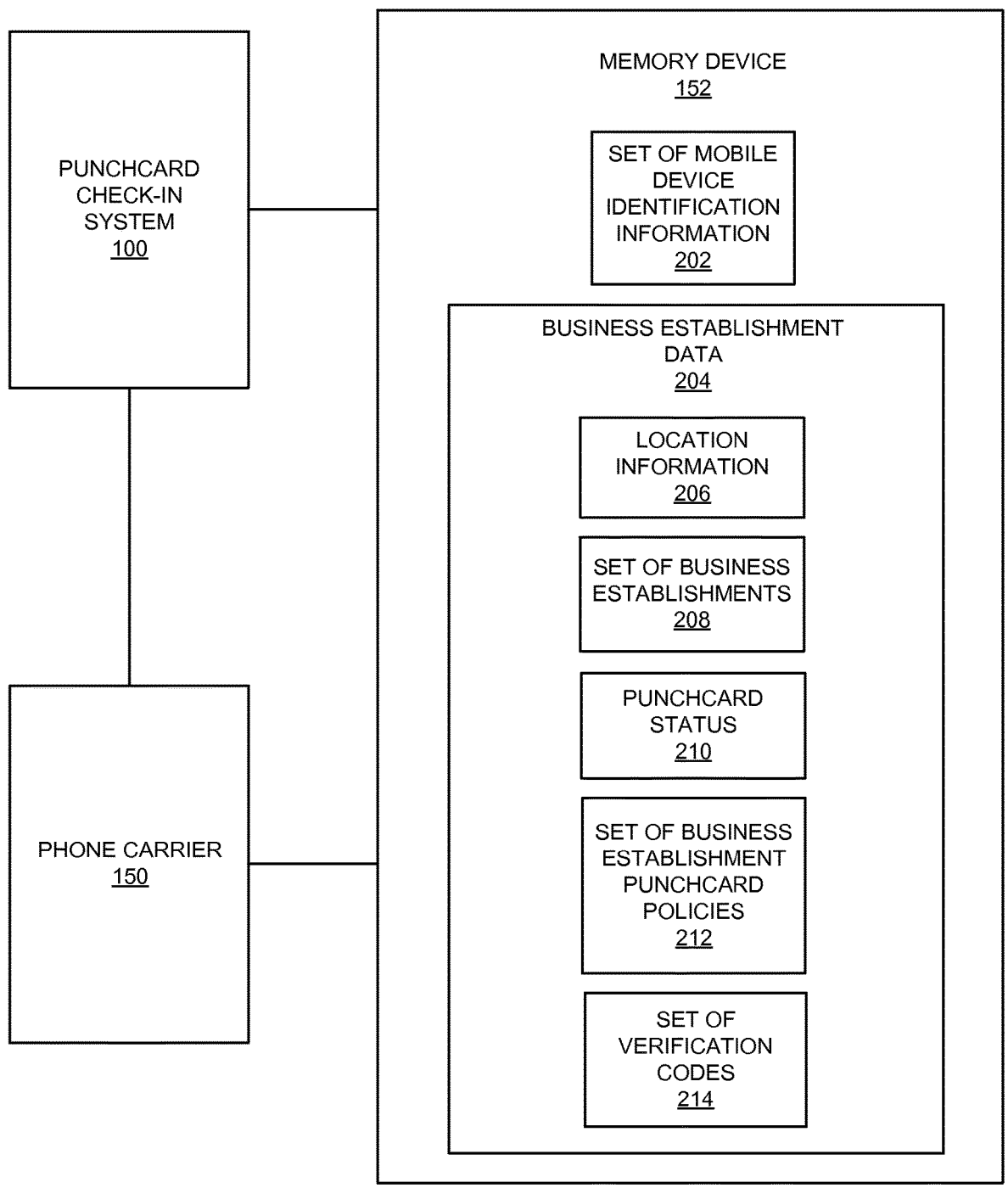
FIG. 2 is a block diagram that illustrates an embodiment of a memory device, in accordance with an embodiment.
Figure 3:
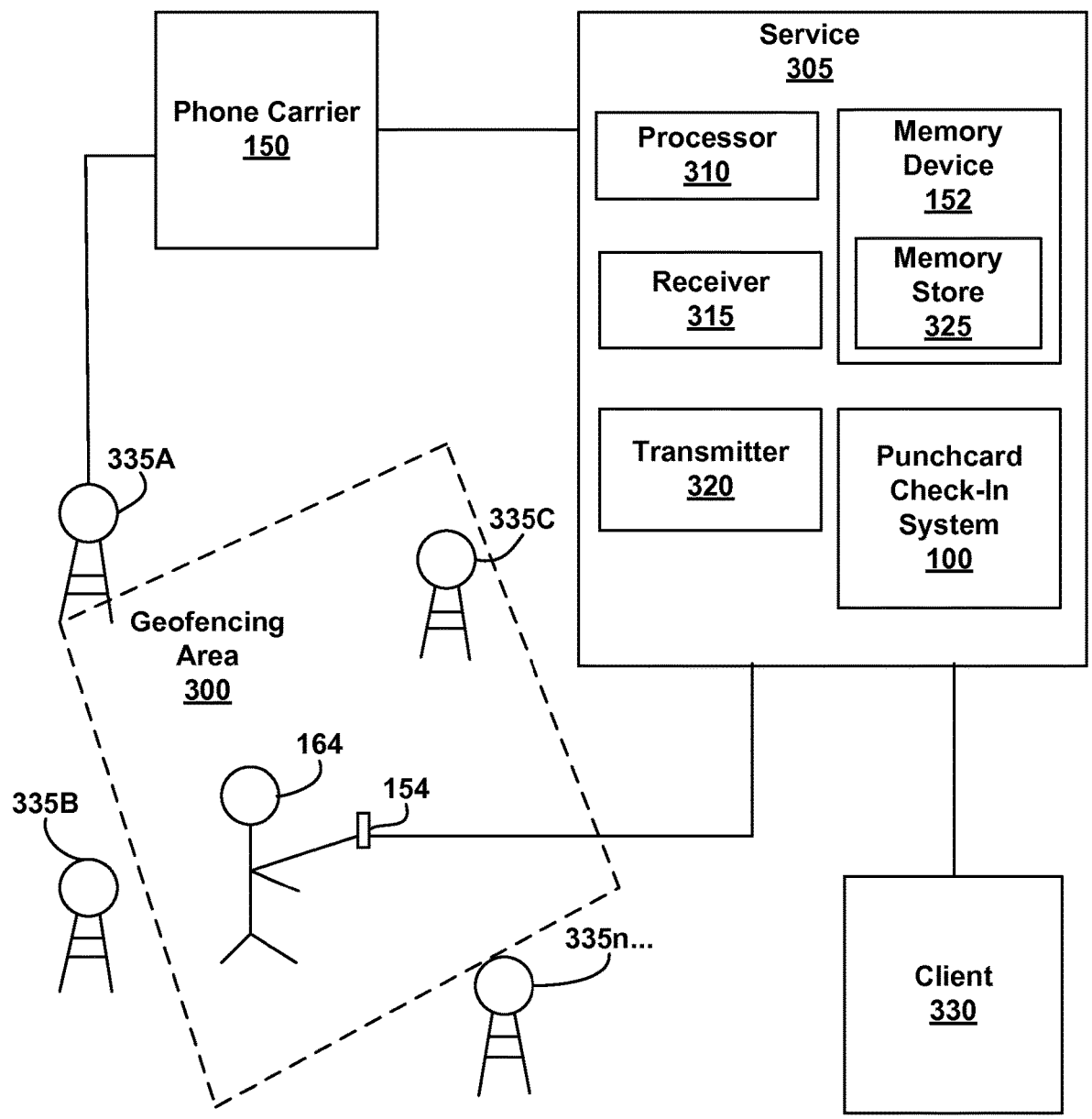
FIG. 3 is a block diagram that illustrates a punchcard check-in system using geofencing technology, in accordance with an embodiment.

The following discussion will begin with a description of a punchcard check-in system, including using geofencing technology, with reference to FIGS. 1-3. The discussion will follow with a description of a method of operation for updating a virtual punchcard check-in system, with reference to FIGS. 1-4. The discussion concludes, with reference to FIG. 5, with a description of an example computer system with which or upon which various embodiments of the present technology may be implemented.

Punchcard Check-in System

FIG. 1 depicts a block diagram that illustrates a punchcard check-in system 100 that is coupled with a computer 500 (see FIG. 5), in accordance with an embodiment. FIG. 2 depicts a block diagram that illustrates the memory device 152 and the contents thereat, in accordance with an embodiment. Of note, the memory device 152 may reside at a service 305 (see FIG. 3), the mobile device 154, or a location communicatively coupled with the mobile device 154. In one embodiment, the mobile device 154 is a mobile phone. Examples presented herein discuss embodiments in terms of including a mobile phone as the mobile device 154. However, it should be appreciated that the mobile device 154 may be a device that is not a mobile phone.

The punchcard check-in system 100 includes the following: an input accessor 102; a mobile device identifier 104; a request sender 116; a location identification receiver 118; and a message generator 120. The punchcard check-in system 100 optionally includes any of the following: a punchcard status updater 136; a message sender 140; and an alert receiver 142. In various embodiments, the mobile device identifier 104 optionally includes any of the following: a mobile device identification information accessor 106; and a comparor 112. Further, in various embodiments, the message generator 120 optionally includes any of the following: a business establishment determiner 122; and a business establishment data accessor 124, a set of business establishment punchcard policy accessor 128; a verification code comparor 162; and the punchcard status updater 136.

The input accessor 102 is coupled with a computer (such as the computer 500 in FIG. 5) and accesses an input to a mobile device. The input includes a verification code that is displayed at a business establishment. The verification code serves as a notification of an attempted check-in of a customer at the business establishment. The customer is associated with the mobile device into which the verification code is entered. For example and with reference to FIG. 2, the input accessor 102 accesses the input 162 at the mobile device 154. The input 162 includes the verification code 168 that is displayed at business establishment 166. The verification code 168 serves as a notification of an attempted check-in of the customer 164 at the business establishment 166. The customer 164 is associated with the mobile device 154 into which the verification code 158 is entered. Thus, the customer 164 walks into the business establishment 166 and sees a sign that displays the verification code 158. The verification code 158 may be combination of numbers, letters, and/or symbols (e.g., 444%%%; hotdog13, etc.) that may be entered into a mobile device. By typing the verification code 158 into the mobile device 154, the customer 164 anticipates that such an action will cause the customer's punchcard (loyalty program card) for the business establishment 166 to be updated according to the customer's 164 visit. The customer 164, in one embodiment, anticipates that the mobile device 154 will then display to the customer 164 the number of times the customer 164 has visited the business establishment 166 and how many more times the customer 164 must visit the business establishment 166 before the customer 164 qualifies to receive a discount offer.

In one embodiment, the mobile device has an application installed thereon that receives the verification code 168, and sends the verification code 168 and/or other message to a service operating the punchcard check-in system 100. In one embodiment, the service operating the punchcard check-in system 100 is an application program itself that runs independent of a human manager. Thus, the service may be located at a site remote from the mobile device and/or business establishment, or may operate on the mobile device and/or at the business establishment. The service either receives or accesses the verification code 168.

The mobile device identifier 104 is coupled with the computer 500. The mobile device identifier 104, based on comparing accessed mobile device identification information with a set of mobile device identification information, identifies the mobile device. This identification achieves "an identified mobile device". For example and with reference to FIG. 2, the mobile device identifier 104, based on comparing the accessed mobile device identification information 110 with a set of mobile device identification information 202 (see FIG. 2), identifies the mobile device 154. This identification achieves the identified mobile device 114. Thus, when the identifier 104 accessed the input 162 at the mobile device 154, the identifier 104 also accesses information about the mobile device 154, termed "mobile identification information" of a set of mobile device identification information 160 that is available for accessing at the mobile device 154. The identifier compares the accessed mobile device identification information 110 with the set of mobile device identification information 202 that is stored at a memory device 152. The memory device 152, in one embodiment, is part of the punchcard check-in system 100.

In another embodiment, the memory device 152 is remote from, but communicatively coupled with the punchcard check-in system 100. The memory device 252 may reside at a separate location from the punchcard check-in system 100. For example, the service operating the punchcard check-in system 100 may reside on a computer in building "A", while the memory device 152 may reside as part of a large database in building "B". Building "A" and building "B" are communicatively coupled with each other, and the punchcard check-in system 100 may access and/or utilize the information stored at the memory device 152. Thus, the mobile device identifier 104 identifies, using the information gathered from the mobile device 154, the mobile device 154 at which the customer 164 entered the input 162. From this mobile device identification, the punchcard check-in system 100 is able to determine which customer is associated with the particular mobile device 154, and eventually associate that customer with business establishment data and customer's punchcard status.

The request sender 116 is coupled with the computer 500 and sends a request for a location check of the mobile device to a phone carrier. For example and with reference to FIG. 2, the request sender 116 sends, to the phone carrier 150, the request 144 for the location check of the mobile device 154. Thus, the request sender 116 requests of the phone carrier 150 to determine the location of the mobile device 154. The phone carrier 150 then "pings" the mobile device 154 to determine the physical location of the mobile device.

The location identification receiver 118 is coupled with the computer 500 and receives from the phone carrier a location identification of the location of the mobile device. For example and with reference to FIG. 2, the location identification receiver 118 receives from the phone carrier 150 the location identification 146 of the location of the mobile device 154. Thus, the phone carrier 150 performed a ping of the mobile device 154 to determine the physical location of the mobile device 154. The phone carrier 150 then sends to the punchcard check-in system 100 or a component communicatively coupled therewith, a determination as to the physical location of the mobile device, "location identification 146".

The message generator 120 is coupled with the computer 500. The message generator 120, if the location identification matches a location of the business establishment, then generates a message, wherein the message includes a punchcard status for the business establishment as it relates to the customer. For example and with reference to FIGS. 2 and 3, the message generator 120, if the location identification 146 matches the location of the business establishment 166, then the message generator 120 generates the message 130. The message 130 includes the punchcard status 132 for the business establishment 166 as it relates to the customer 164. Thus, the message generator 120 generates the message 130 that includes the customer's punchcard status 132 for the business establishment 166. This generation of the message 130 occurs if the location of the business establishment 166 is determined to be the same as the location identification 146 of the mobile device 154. The punchcard check-in system 100 determines the location of the business establishment 166 from the business establishment data 204 stored at the memory device 152 (the location of which is already discussed herein). For example, the business establishment data 204 includes a collection of the set of business establishments 208, as well as each business', of the set of business establishments 208, location information 206. Of note the set of business establishments 208 may include any number of businesses. In another embodiment, the message 130 includes customer opportunities available at the business establishment 166 based on the updated punchcard status 138 of the customer 164. In one embodiment, the message 130 is displayed at the mobile device 154. In another embodiment, the message 130 is communicated to the mobile device 154 via audio and/or visual techniques known in the art.

In one embodiment, the message generator 120 includes a business establishment determiner 122. The business establishment determiner 122 determines to which business establishment of a set of business establishments the verification code is linked to achieve a determined business establishment. For example and with reference to FIGS. 1 and 2, the business establishment determiner 122 determines to which business establishment of the set of business establishments 208 the verification code 168 is linked, thus achieving the determined business establishment 126. Thus, the business establishment determiner 122 accesses the information stored regarding the set of business establishments 208 and the information stored regarding the set of verification codes 214 to determine which business establishment to which a particular verification code is assigned. Of note, the stored set of business establishments 208 and the stored set of verification codes 214 include a linking indication between business establishments of the stored set of business establishments and verification codes of the stored set of verification codes. For example, a business establishment, with the intention of utilizing and/or becoming a part of the punchcard check-in system 100 or part of a service using the punchcard check-in system 100, makes available to the punchcard check-in system 100 the verification code that the business establishment is going to display at its store, and the punchcard policies associated therewith. These punchcard policies include offers, discounts, time limits, etc.

In one embodiment, the message generator 120 includes a business establishment data accessor 124, a set of business establishment punchcard policy accessor 128, a verification code comparor 162, and the punchcard status updater. The business establishment data accessor 124 uses the identified mobile device and accesses business establishment data to which the identified mobile device is linked. The business establishment data includes a punchcard status for each business establishment of a set of business establishments as it relates to the customer. For example and with reference to FIGS. 1 and 2, the business establishment data accessor 124 uses the identified mobile device 114 and accesses the business establishment data 204 to which the identified mobile device 114 is linked. The business establishment data 204 includes the punchcard status 210 for each business establishment of the set of business establishments 208 as it relates to the customer 164. Thus, the business establishment data accessor 124 is able to determine the punchcard status 210 for the business establishment 166 at which the verification code 158 is displayed. The set of business establishment punchcard policy accessor 128 accesses the set of business establishment punchcard policies. For example and referring to FIGS. 1 and 2, the set of business establishment punchcard policy accessor 128 accesses the set of business establishment punchcard policies 212. The verification code comparor 162 compares the verification code with a set of verification codes linked with the set of business establishment punchcard policies. For example and with reference to FIGS. 1 and 2, the verification code comparor 162 compares the verification code 168 that is linked with the set of business establishment punchcard policies 212. The punchcard status updater 136, as described herein, updates the punchcard status 210 of the customer 164 that is associated with the determined business establishment 126 to achieve the "updated punchcard status" 138 of the customer 164.

In one embodiment, the mobile device identification information accessor 106, of the mobile device identifier 104, accesses the mobile device identification information of the mobile device to achieve an accessed mobile device identification information. For example and with reference to FIG. 1, the mobile device identification information accessor 106 accesses the mobile device identification information 160, information about the mobile device, of the mobile device 154, thus achieving an "accessed mobile device identification information" 110. Thus, mobile device identifier 104 includes a mobile device identification information accessor 106. The mobile device identification information accessor 106 retrieves or receives the mobile device identification information 160 about the mobile device 154.

The comparor 112 compares the accessed mobile device identification information with a set of mobile device identification information. For example and with reference to FIGS. 1 and 2, the comparor 112 compares the accessed mobile device identification information 110 with the set of mobile device identification information 202. The set of mobile device identification information 202 is stored at the memory device 152. Thus, the mobile device identifier 104 includes the comparor 112. The set of mobile device identification information 202 that is stored at the memory device 152 includes information about one or more mobile devices that has been stored at the memory device 152. The stored set of mobile device identification information 202 may or may not include a portion less than the whole of, or the whole of, the mobile device identification information 160.

Additionally, in one embodiment the accessed mobile device identification information includes a set of mobile device identification data that corresponds to a set of mobile device identification information, wherein the set of mobile device identification information links the identified mobile device with business establishment data. For example and with reference to FIGS. 1 and 2, the accessed mobile device identification information 110 includes a set of mobile device identification data that corresponds to the set of mobile device identification information 202. The set of mobile device identification information 202 links the identified mobile device 114 with business establishment data 204. Thus, information within the set of mobile device identification information 202 is linked to information within the business establishment data 204. For example, a mobile device, such as mobile device 154, is linked to business, "Poodlemart", located in city, "St. Louis", of the business establishment data.

It should be noted that the business establishment data 204 includes not only the location information 206 and the set of business establishments 208, but also optionally includes the punchcard status 210, the set of business establishment punchcard policies 212, and the set of verification codes 214.

The punchcard status updater 136 is coupled with the computer 500. The punchcard status updater 136, if the location identification matches a location of the business establishment, updates the punchcard status of the punchcard. For example and with reference to FIGS. 1 and 2, the punchcard status updater 136, if the location identification 146 matches a location of the business establishment 166, updates the punchcard status 210 of the punchcard associated with the business establishment 166. Thus, when it is determined that the location of the business establishment 166 is the same as the location at which the mobile device 154 is found to be, then the punchcard check-in system 100 updates the punchcard status 210 of the punchcard of the business establishment 166 that is found to be associated with the customer 164 having the mobile device 154.

The message sender 140 is coupled with the computer 500. The message sender 140 sends the message 130 to the mobile device 154, via the phone carrier 150.

FIG. 3 is a block diagram that illustrates the punchcard check-in system 100 using geofencing technology, in accordance with an embodiment. The alert receiver 142 is coupled with the computer 500. The alert receiver 142 receives, from the phone carrier 150, an alert that indicates that the mobile device is within a geofenced area of a set of geofenced areas, wherein the geofenced area includes the business establishment and the set of geofenced areas includes a set of business establishments that includes the business establishment. For example and with reference to FIGS. 1-3, the alert receiver 142 receives, from the phone carrier 150, an alert 148 that indicates that the mobile device 154 is within a geofenced area 300 of a set of geofenced areas, wherein the geofenced area 300 includes the business establishment 166 and the set of geofenced areas includes a set of business establishments (wherein the set of business establishments includes the business establishment 166).

Thus, embodiments of the present technology, functioning in conjunction with any type of mobile device, upon receiving a verification code, request the phone carrier to ping the mobile device, to verify that the mobile device (and hence the customer carrying the mobile device) is actually at the business establishment. Embodiments receive this "localization" (locating the position of the mobile device) information, recognize that the customer is at a particular business establishment that utilizes the punchcard check-in system 100 described herein, and automatically checks the customer in while updating the customer's punchcard in the process. Embodiments then, in one embodiment, send a message to the customer regarding the customer's punchcard status and communicate available offers based on the current punchcard status. As noted, embodiments function with any type of mobile device.

FIG. 3 shows a service 305 communicatively coupled with the client 330, the phone carrier 150 and the mobile device 154 of the customer 164. The service 305 includes the following components: a processor 310; a receiver 315; a transmitter 320; a memory device 152 including a memory store 325; and the punchcard check-in system 100. The service 305, the mobile device 154 and the phone carrier 150 are shown communicatively and wirelessly coupled with each other. The service 305 is also communicatively and wirelessly coupled with the client 330. FIG. 1 also shows a geofencing area 300 and antenna towers 335A, 335B, 335C and 335*n* . . . hereinafter, "antenna towers 335", unless specifically noted otherwise). The geofencing area 300 is a known geofenced area, for which location information 206 is stored at the memory device 152 that is accessible to the service 305. The antenna towers 335 function in conjunction with localization technology, as is known in the art.

The service 300 is a business that arranges for the method described herein to occur, such as: securing the contracts/agreements with the phone carrier 150, the client 330 (e.g., retailer [business establishment], etc.) and the customer 164; accessing the input 162 to the mobile device 154; identifying the mobile device 154; sending the request 144 to the phone carrier 150; receiving from the phone carrier 150 the location identification 146 of the location of the mobile device 154; and generating the message 130. According to an embodiment, an entity (e.g., service 305), provides compensation to a phone carrier 150 for pinging a mobile device 154 of a customer 164. In one embodiment, the compensation is money per ping of the mobile device 154 to be paid to the phone carrier 150.

Accessible to the service 305 and/or residing at the service 305 are at least the following: the processor 310; the memory device 152; the receiver 315; the transmitter 320; and the punchcard check-in system 100. Of note, in one embodiment, the phone carrier 150 determines the location identification 146 of the mobile device 154. In another embodiment, the phone carrier 150 pings the mobile device 154 and gathers xy coordinate information about the location of the mobile device 154 and communicates this information to the service 305, that includes the punchcard check-in system 100. The service 305 determines which geofenced area includes the location information gathered by the phone carrier 150 during the pinging process. The service 305 accomplishes this, via the punchcard check-in system 100, by analyzing the xy coordinates of the location information gathered by the phone carrier 150 and comparing them to the xy coordinate information (set of location information) stored at the memory device 152.

The processor 310 is configured for executing the methods described herein at least with regard to the punchcard check-in system 100. The processor 310 may be implemented, for example, by one or more discrete modules (or data processing components) that are not limited to any particular hardware, firmware, or software (i.e., machine readable instructions) configuration. The processor 310 may be implemented in any computing or data processing environment, including in digital electronic circuitry, e.g., an application-specific integrated circuit, such as a digital signal processor (DSP) or in computer hardware, firmware, device driver, or software (i.e., machine readable instructions). In some implementations, the functionalities of the modules are combined into a single data processing component. In other versions, the respective functionalities of each of one or more of the modules are performed by a respective set of multiple data processing components.

The memory device 152 stores process instructions (e.g., machine-readable code, such as computer software) for implementing methods executed by processor 310, as well as data that processor 310 generates or processes. The memory device 152 may include one or more tangible machine-readable storage media. Memory devices suitable for embodying these instructions and data include all forms of computer-readable memory, including, for example, semiconductor memory devices, such as EPROM, EEPROM, and flash memory devices, magnetic disks such as internal hard disks and removable hard disks, magneto-optical disks, and ROM/RAM devices.

The receiver 315 is configured for receiving the input 156 that had been entered into the mobile device 154, wherein the input 156 includes the verification code 158 that is displayed at the business establishment 166, wherein the entered verification code 168 serves as a notification of an attempted check-in of the customer 164 at the business establishment 166, wherein the customer 164 is associated with the mobile device 154.

The transmitter 320 is configured for: sending the request 144 for a location check of the mobile device 154 to the phone carrier 150; and transmitting to the mobile device 154, via the phone carrier 150, the message 130.

Embodiments utilize a phone carrier's ability to apply localization technology to determine the customer's physical position via determining the position of the customer's mobile device. This localization technology that may be used with embodiments is known in the art and includes, but is not limited to, the following techniques: network-based; SIM; WiFi; and a hybrid of the foregoing. Various phone carriers utilize one or more of the foregoing techniques.

Example Methods of Operation

Figure 4:
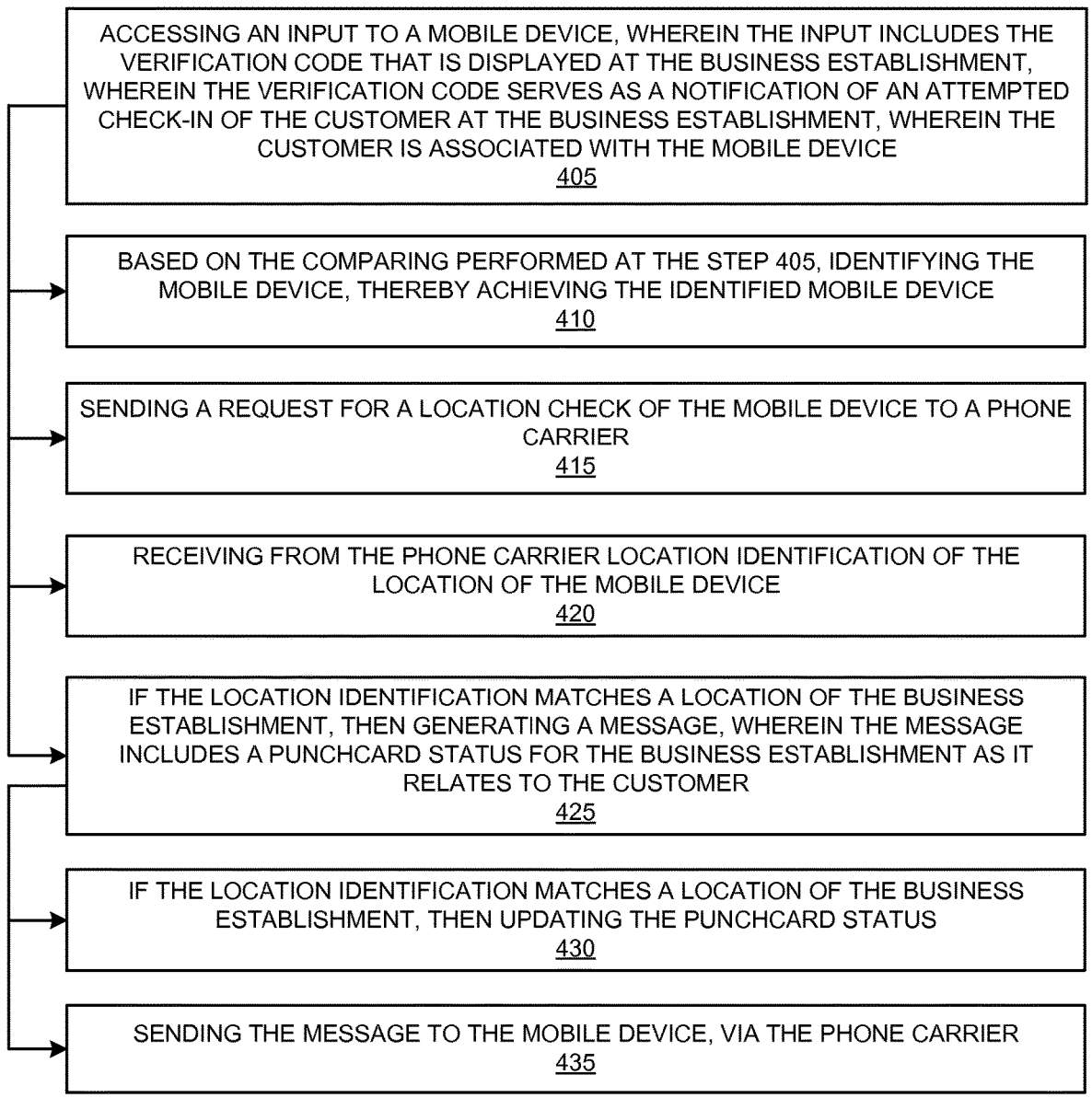
FIG. 4 depicts a flow diagram for a method for providing a punchcard check-in system, in accordance with an embodiment.

The following discussion sets forth in detail some example methods of operation of embodiments. With reference to FIG. 4, a flow diagram of method 400 for updating a punchcard of a customer, wherein the punchcard is associated with a business establishment, illustrates an example procedure used by various embodiments. Method 400 includes some procedures that, in various embodiments, are carried out by a processor under the control of computer-readable and computer-executable instructions. In various embodiments, these computer-readable and computer-executable instructions are described as "code segments", and presented separately (e.g., first codes segment, second code segment, etc.) to describe such instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within a virtualization infrastructure. The computer-readable and computer-executable instructions, which reside on tangible computer readable storage media, are used to control or operate in conjunction with, for example, one or some combination of processors of a virtual machine. It is appreciated that the processor(s) may be physical or virtual or some combination (it should also be appreciated that a virtual processor is implemented on physical hardware).

The following discussion of method 400 references FIGS. 1-4 unless specifically noted otherwise.

At step 405 of method 400, in one embodiment and as described herein, an input 156 to the mobile device 154 is accessed, wherein the input 156 includes the verification code 158 that is displayed at the business establishment 166, wherein the verification code 158 serves as a notification of an attempted check-in of the customer 164 at the business establishment 166, wherein the customer 164 is associated with the mobile device 154.

At step 410 of method 400, in one embodiment and as described herein, based on the comparing performed at step 405, the mobile device 154 is identified, thereby achieving the identified mobile device 114.

At step 415 of method 400, in one embodiment and as described herein, the request 144 for a location check of the mobile device 154 is sent to the phone carrier 150.

At step 420 of method 400, in one embodiment and as described herein, the location identification 146 of the location of the mobile device 154 is received from the phone carrier 150.

At step 425 of method 400, in one embodiment and as described herein, if the location identification 146 matches a location of the business establishment 166, then the message 130 is generated, wherein the message 130 includes a punchcard status 210 for the business establishment 166 as it relates to the customer 164.

At step 430 of method 400, in one embodiment and as described herein, if the location identification 146 matches a location of the business establishment 166, then the punchcard status 210 is updated.

At step 435 of method 400, in one embodiment and as described herein, the message 130 is sent to the mobile device 154, via the phone carrier 150.

Example Computer System

Figure 5:
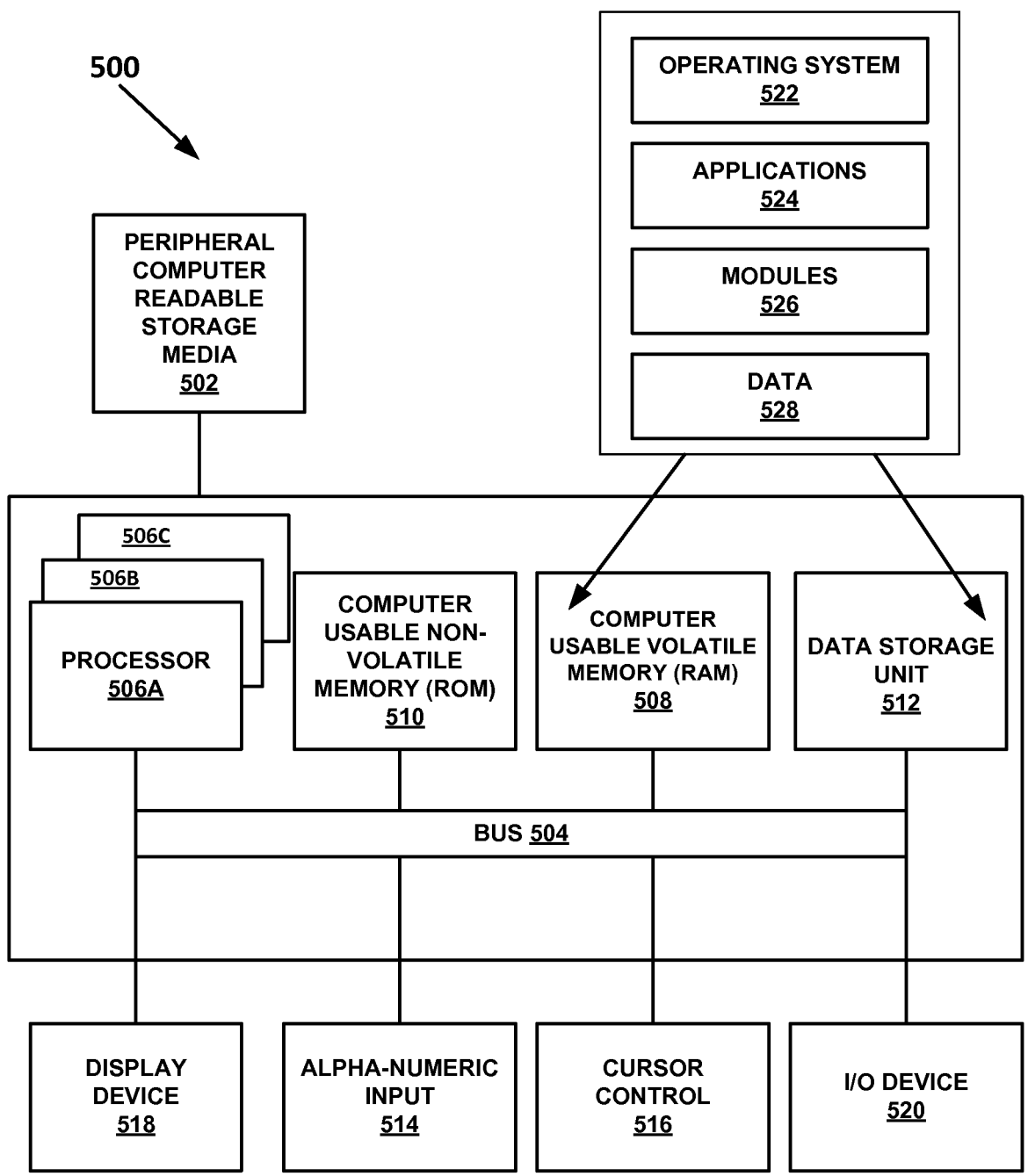
FIG. 5 is a block diagram of an example computer system with which or upon which various embodiments of the present invention may be implemented.

With reference now to FIG. 5, all or portions of some embodiments described herein are composed of computer-readable and computer-executable instructions that reside, for example, in computer-usable/computer-readable storage media of a computer system. That is, FIG. 5 illustrates one example of a type of computer (computer system 500) that can be used in accordance with or to implement various embodiments which are discussed herein. It is appreciated that computer system 500 of FIG. 5 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, distributed computer systems, media centers, handheld computer systems, multi-media devices, and the like. Computer system 500 of FIG. 5 is well adapted to having peripheral non-transitory computer-readable storage media 502 such as, for example, a floppy disk, a compact disc, digital versatile disc, other disc based storage, universal serial bus "thumb" drive, removable memory card, and the like coupled thereto.

System 500 of FIG. 5 includes an address/data bus 504 for communicating information, and a processor 506A coupled with bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors, and may be the processor 502 described with respect to FIG. 3. System 500 also includes data storage features such as a computer usable volatile memory 508, e.g., random access memory (RAM), coupled with bus 504 for storing information and instructions for processors 506A, 506B, and 506C.

System 500 also includes computer usable non-volatile memory 510, e.g., read only memory (ROM), coupled with bus 504 for storing static information and instructions for processors 506A, 506B, and 506C. In one embodiment, the memory device 152 of FIGS. 1-3 is an example the computer usable volatile memory 508 and/or the computer usable non-volatile memory 510. Also present in system 500 is a data storage unit 512 (e.g., a magnetic or optical disk and disk drive) coupled with bus 504 for storing information and instructions. System 500 also includes an optional alphanumeric input device 514 including alphanumeric and function keys coupled with bus 504 for communicating information and command selections to processor 506A or processors 506A, 506B, and 506C. System 500 also includes an optional cursor control device 516 coupled with bus 504 for communicating user input information and command selections to processor 506A or processors 506A, 506B, and 506C. In one embodiment, system 500 also includes an optional display device 518 coupled with bus 504 for displaying information.

Referring still to FIG. 5, optional display device 518 of FIG. 5 may be a liquid crystal device, cathode ray tube, plasma display device or other display device suitable for creating graphic images and alphanumeric characters recognizable to a user. Optional cursor control device 516 allows the computer user to dynamically signal the movement of a visible symbol (cursor) on a display screen of display device 518 and indicate user selections of selectable items displayed on display device 518. Many implementations of cursor control device 516 are known in the art including a trackball, mouse, touch pad, joystick or special keys on alphanumeric input device 514 capable of signaling movement of a given direction or manner of displacement. Alternatively, it will be appreciated that a cursor can be directed and/or activated via input from alphanumeric input device 514 using special keys and key sequence commands. System 500 is also well suited to having a cursor directed by other means such as, for example, voice commands. System 500 also includes an I/O device 520 for coupling system 500 with external entities. For example, in one embodiment, I/O device 520 is a modem for enabling wired or wireless communications between system 500 and an external network such as, but not limited to, the Internet.

Referring still to FIG. 5, various other components are depicted for system 500. Specifically, when present, an operating system 522, applications 524, modules 526, and data 528 are shown as typically residing in one or some combination of computer usable volatile memory 508 (e.g., RAM), computer usable non-volatile memory 510 (e.g., ROM), and data storage unit 512. In some embodiments, all or portions of various embodiments described herein are stored, for example, as an application 524 and/or module 526 in memory locations within RAM 508, computer-readable storage media within data storage unit 512, peripheral computer-readable storage media 402, and/or other tangible computer-readable storage media.

I claim:

1. A computing device comprising:
one or more processors configured to:
receive a verification code, from a mobile device,
said verification code indicating a check-in of a customer at a business establishment,
said customer associated with said mobile device;
receive a mobile device identification information from said mobile device;
access a stored set of mobile device identification information, the stored set of mobile device identification information comprising:
a mobile device identifier; and
a customer identifier;
compare said received mobile device identification information with the stored set of mobile device identification information;
identify, based on the comparing, said mobile device;
send, to a phone carrier, a request for a location check of said identified mobile device;
receive, from said phone carrier, a location of said mobile device; and
send a message to the mobile device, when said location of said mobile device matches a location of said business establishment, said message comprises a punchcard status for said business establishment as it relates to said customer.

2. The computing device of claim 1, where the one or more processors are further to:
update said punchcard status when said location of said mobile device matches a location of said business establishment.

3. The computing device of claim 1, where the one or more processors are further to:

send said message to said mobile device, via the phone carrier.

4. The computing device of claim 1, wherein said message comprises customer opportunities available at said business establishment.

5. The computing device of claim 1, where the one or more processors are further to:
  determine which business establishment, of a set of business establishments, is linked to said verification code to achieve a determined business establishment.

6. The computing device of claim 5, where the one or more processors are further to:
  use said identified mobile device to access a business establishment data to which said identified mobile device is linked,
    said business establishment data comprises a punchcard status for each business establishment of a set of business establishments as it relates to said customer;
  access a set of business establishment punchcard policies;
  compare said verification code with a set of verification codes linked with said set of business establishment punchcard policies; and
  update said punchcard status of said customer that is associated with said determined business establishment to achieve an updated punchcard status.

7. The computing device of claim 1, where the one or more processors are further to:
  receive, from the phone carrier, an alert indicating that said mobile device is within a geofenced area, said geofenced area identifying said business establishment.

8. A non-transitory computer-readable medium storing instructions, the instructions comprising:
  one or more instructions that, when executed by one or more processors, cause the one or more processors to:
    receive a verification code, from a mobile device,
      said verification code indicating a check-in of a customer at a business establishment,
      said customer associated with said mobile device;
    receive a mobile device identification information from said mobile device;
    access a stored set of mobile device identification information, the stored set of mobile device identification information comprising:
      a mobile device identifier; and
      a customer identifier;
    compare said received mobile device identification information with the stored set of mobile device identification information;
    identify, based on the comparing, the mobile device;
    send, to a phone carrier, a request for a location check of said identified mobile device;
    receive, from said phone carrier, a location of said mobile device; and
    send a message to the mobile device when said location of said mobile device matches a location of said business establishment,
      said message comprising a punchcard status for said business establishment as it relates to said customer.

9. The non-transitory computer-readable medium of claim 8, where the one or more instructions, when executed by the one or more processors, further cause the one or more processors to:
  update said punchcard status when said location of said mobile device matches a location of said business establishment.

10. The non-transitory computer-readable medium of claim 8, where the one or more instructions, when executed by the one or more processors, further cause the one or more processors to:
  send said message to said mobile device, via the phone carrier.

11. The non-transitory computer-readable medium of claim 8, wherein said message comprises customer opportunities available at said business establishment.

12. The non-transitory computer-readable medium of claim 8, where the one or more instructions, when executed by the one or more processors, further cause the one or more processors to:
  determine which business establishment, of a set of business establishments, is linked to said verification code to achieve a determined business establishment.

13. The non-transitory computer-readable medium of claim 12, where the one or more instructions, when executed by the one or more processors, further cause the one or more processors to:
  use said identified mobile device to access a business establishment data to which said identified mobile device is linked,
    said business establishment data comprises a punchcard status for each business establishment of a set of business establishments as it relates to said customer;
  access a set of business establishment punchcard policies;
  compare said verification code with a set of verification codes linked with said set of business establishment punchcard policies; and
  update said punchcard status of said customer that is associated with said determined business establishment to achieve an updated punchcard status.

14. The non-transitory computer-readable medium of claim 8, where the one or more instructions, when executed by the one or more processors, further cause the one or more processors to:
  receive, from the phone carrier, an alert indicating that said mobile device is within a geofenced area, said geofenced area identifying said business establishment.

* * * * *